April 8, 1952 L. S. WILLIAMS 2,592,499
WEIGHING SCALE PENDULUM
Filed May 3, 1946 4 Sheets-Sheet 1
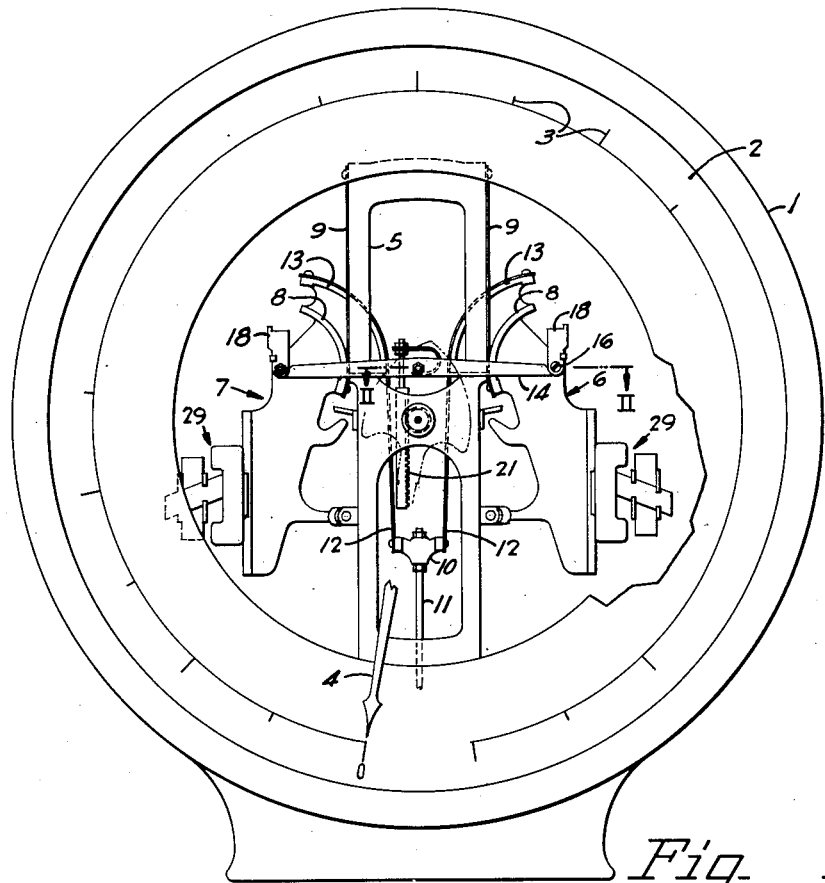
Fig. I
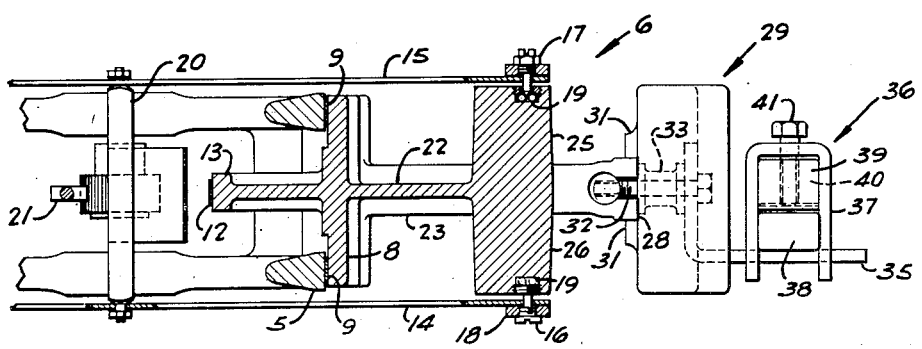
Fig. II
INVENTOR.
Lawrence S. Williams
BY
Marshall and Marshall
ATTORNEYS April 8, 1952 L. S. WILLIAMS 2,592,499
WEIGHING SCALE PENDULUM
Filed May 3, 1946 4 Sheets-Sheet 2
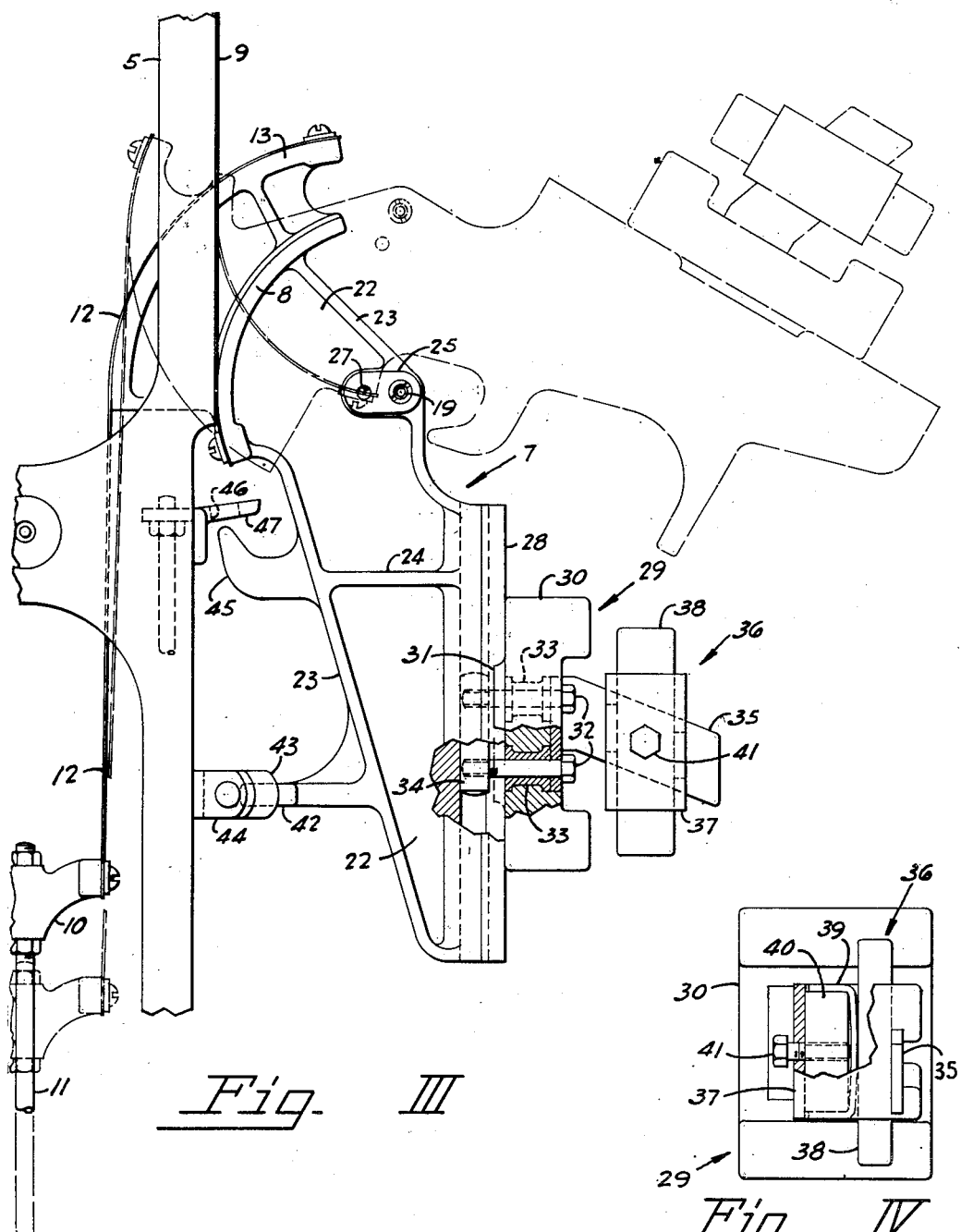
Fig. III
Fig. IV
INVENTOR.
Lawrence S. Williams
BY
Marshall and Marshall
ATTORNEYS

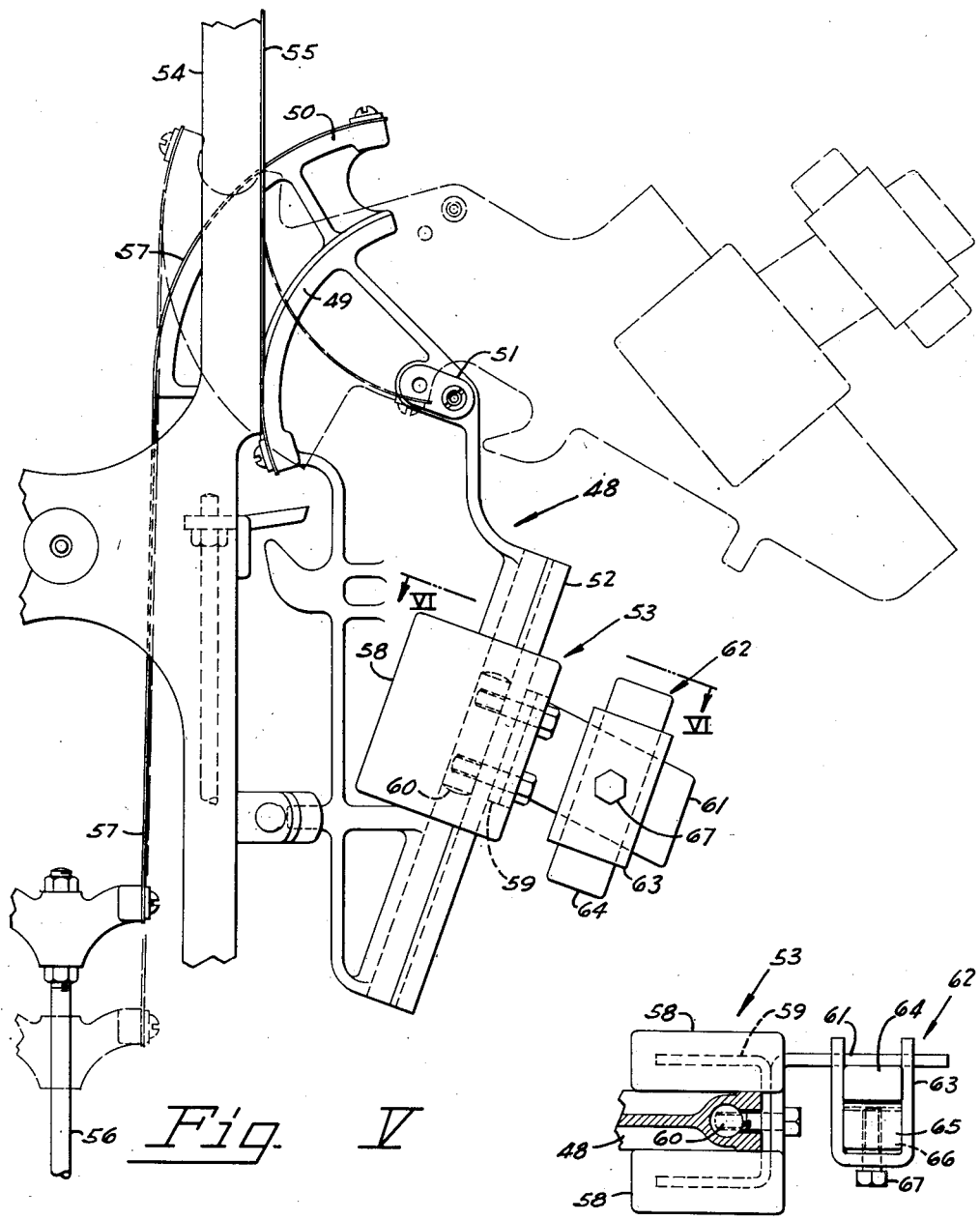

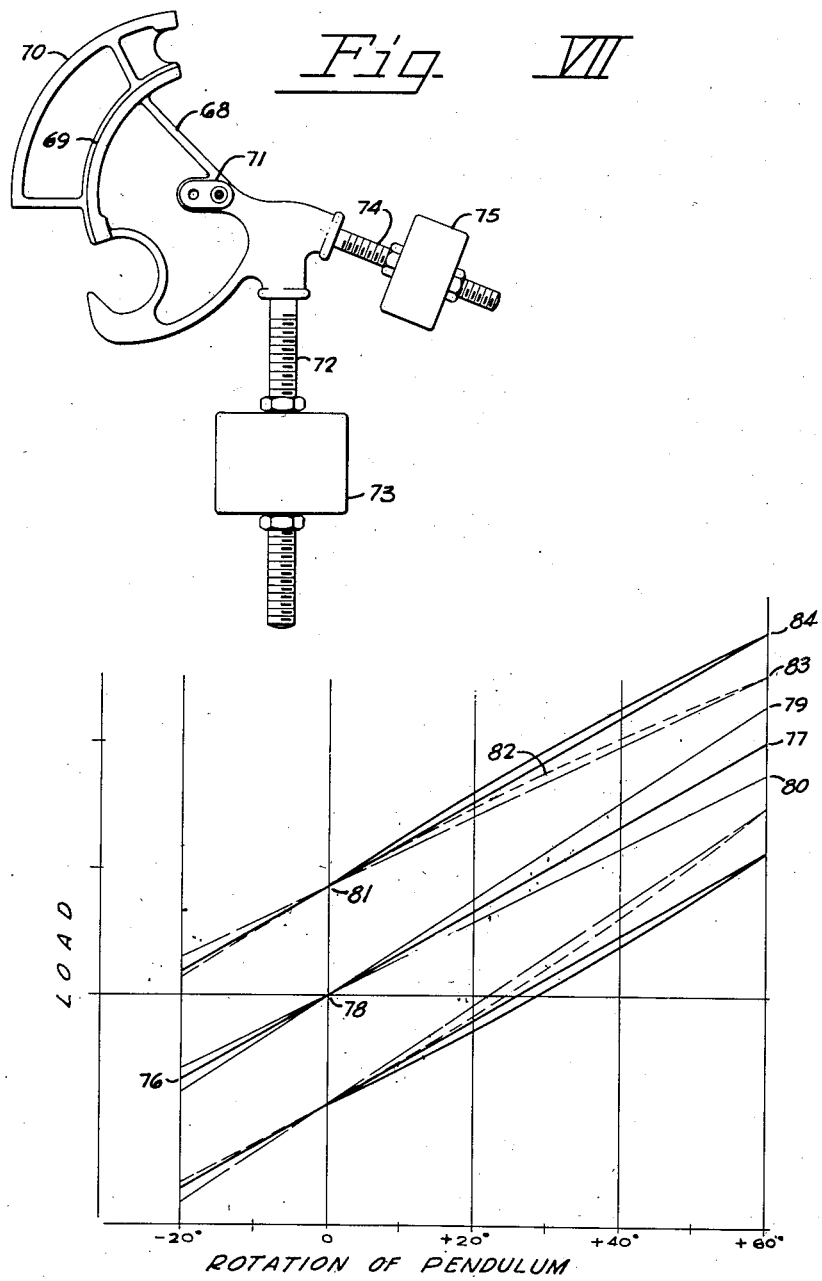

Patented Apr. 8, 1952

2,592,499

UNITED STATES PATENT OFFICE 2,592,499

WEIGHING SCALE PENDULUM

Lawrence S. Williams, Toledo, Ohio, assignor to Toledo Scale Company, Toledo, Ohio, a corporation of New Jersey Application May 3, 1946, Serial No. 667,082

6 Claims. (Cl. 265—62)

This invention relates to weighing scales and more particularly to pendulums which are used as counterbalancing elements in weighing scales.

Pendulums for use in weighing scales may be divided into two broad classes, commonly called fixed center pendulums and floating pendulums. A fixed center pendulum is one which is pivoted at its turning center so that it rotates without translation under the influence of a load to be weighed. A floating pendulum is one that is mounted so that its movement under the influence of a load to be weighed is a combination of rotation and translation.

A floating pendulum as it is commonly constructed is provided with a pair of fulcrum sectors concentric with respect to the turning center of the pendulum in lieu of knife edges or other bearings. The pendulum is suspended at the side of a rigid framework, called a sector guide, by steel ribbons attached to the guide and to the lower ends of the fulcrum sectors. Loads are applied to the pendulum by means of a power ribbon that overlies an arcuate surface of the pendulum assembly commonly called a power sector. When increments of load are applied to the power ribbon of a floating pendulum it rotates about its turning center and the turning center is translated upwardly a distance determined by the radius of the fulcrum sectors and the angles through which the pendulum turns. Either the upward translation of the turning center or the downward movement of the power ribbon may be used as a measure of the load. The floating pendulum has an advantage over a fixed center pendulum because the ribbons supporting the pendulum are not subject to wear or friction which would adversely affect the accuracy of the indication.

To provide for adjustment, a floating pendulum, whether the upward translation of the pendulum or the movement of the power ribbon is used as a measure of load, usually is provided with a threaded stem along which a weight may be moved and means for changing the angular relation of the threaded stem with respect to the sectors. The earliest design of floating pendulum employed a threaded stem which was vertical and in line with the fulcrum ribbons when the indicator was at zero. It differed from a fixed center pendulum only by the substitution of the fulcrum sectors and ribbons for the pivotal mounting of the fixed center pendulum. Such early pendulum counterbalances were difficult to adjust because it was necessary to make simultaneous corrections of the power or capacity (difference in load or pull exerted by the pendulum at the ends of its travel) and straight line adjustment. (Straight line adjustment is that adjustment which gives correct half capacity indication when the scale is adjusted for correct zero and full capacity indication.) These adjustments were interrelated in that no change could be made in one of the adjustments without affecting the other.

For convenience in commercial production and sector guide design the downward and inward travel of these early floating pendulums was limited so that the threaded stem and the weight thereon would clear the sector guide when the indicator stood at zero. This change, while it facilitated the manufacture and assembly of the entire weighing mechanism, increased the difficulty of adjusting the scale to secure correct indications because the initial pull was changed by either adjustment. The initial pull of a pendulum is the pull exerted on the power ribbon or steelyard rod when the pendulum is in its zero net load position. The initial pull is used to support the lever system and the dead load of the load receiver.

The next development in floating pendulum design was to return the threaded stems to vertical at zero, so that the initial pull at zero would not be changed by movement of the weight along the threaded stem, and to relocate the threaded stem so that its axis passed between the turning center of the pendulum and the periphery of the fulcrum sectors and far enough from the plane of the fulcrum ribbons so that the weight on the stem would not interfere with the sector guide. This design allowed the position of the weight to be adjusted through a considerable range without altering or adjusting the bumpers used to stop the pendulum when it swung through the vertical position. This floating pendulum, while an improvement over the earlier floating pendulum, was still difficult to adjust because any movement of the weight along the threaded stem to correct an error at full capacity required a change in angular position of the threaded stem with respect to the sectors to maintain a correct half capacity indication. One disadvantage of this floating pendulum from a manufacturing standpoint is the difficulty of securing adjustment and rigidity between the threaded stem and the sector assembly. The disadvantages from an adjusting standpoint come not only from the interaction of the adjustments one upon the other, but also from the fact that any adjustment of the angular relation between the sector and the threaded stem causes the sector to assume a new angular position for a given load. This means that either the indicator must be moved on its shaft or the connection between the turning center of the pendulum and the indicator must be adjusted. In many scales locking means to hold the pendulums at zero when the scale moved are included in the structure. These locking means must also be adjusted every time a substantial change in the angular relation between the threaded stem and the sectors is made.

The principal object of this invention is to provide a pendulum in which the adjustments are substantially independent of each other.

Another object of the invention is to provide a weighing scale pendulum in which the correct adjustment of one adjusting means may be effected even though another adjusting means is still subject to a substantial error.

A still further object of the invention is to provide a floating pendulum which is adjusted by the translation of weights along paths that are fixed with respect to the turning center of the pendulum.

A still further object of the invention is to provide a floating pendulum having an eccentric power sector in which the adjustments are made by the translation of weights along paths that are fixed with respect to the sectors of the pendulum.

Yet another object of the invention is to provide a pendulum for a weighing scale which pendulum comprises a frame having integrally formed fulcrum and power sectors and a track along which an adjusting weight may be moved.

These and other objects and advantages are provided by an improved pendulum, examples of which are illustrated in the accompanying drawings.

The invention consists of a floating pendulum having tracks fixed with respect to the sectors with the tracks located so that movement of a weight along one track does not affect an adjustment provided by moving another weight along another track.

The improved pendulum, examples of which are illustrated in the accompanying drawings, is the result of my discovery that when a floating pendulum is adjusted to different capacities by moving a weight along a threaded stem and making the corresponding adjustments in the angular relation between the stem and the sectors, the center of gravity of the pendulum moves along a straight line bearing a definite angular relationship with respect to the sector assembly. The line or locus along which the center of gravity moves when the capacity of the pendulum is varied passes on that side of the turning center of the pendulum opposite the fulcrum and power sectors. When the pendulum is constructed so that the capacity adjusting weight is movable along a track parallel to the locus of the centers of gravity, the movement of the weight alters the capacity of the pendulum and simultaneously changes the angular relation of the center of gravity with respect to the sectors to provide the required straight line correction. This automatic change in angular relationship very materially simplifies the adjustment of the pendulum.

I have also discovered that the straight line correction for a pendulum may be made without affecting the capacity adjustment when a second weight is moved along a track bearing a definite angular relationship with respect to the track along which the capacity adjustment weight is moved. The movement of the second weight, to effect a straight line adjustment, changes the initial pull of the scale. In the improved pendulum this change in initial pull is a fixed multiple of the straight line correction obtained by moving the weight. Therefore the straight line correction may very easily be made by noting the change in indication of the scale at half capacity as the adjusting weight is moved.

Pendulums designed according to these discoveries offer many advantages over the previous pendulums because not only are the adjustments substantially independent of each other but also the angular adjustment of the sectors with respect to the pendulum stem can be eliminated so that a much lighter, more rigid pendulum may be made. The elimination of the angular adjustment also eliminates any need for the adjustments in the indicator connection and in the locking mechanism. It is also possible to select a certain angle for the initial position of the pendulum so that the initial pull remains constant for all changes of capacity of the pendulum made by moving the major adjusting weight.

Examples of pendulums embodying the invention are illustrated in the accompanying drawings.

In the drawings:

Figure I is a front elevation of a load counterbalancing and indicating mechanism embodying the invention.

Figure II is a horizontal section taken substantially along the line II—II of Figure I.

Figure III is an enlarged fragmentary rear elevation of the counterbalancing mechanism shown in Figure I.

Figure IV is a side elevation partly in section and with parts broken away of the adjusting weight mounted on the pendulum shown in Figure III.

Figure V is a fragmentary rear elevation of load counterbalancing mechanism embodying a modified form of the invention.

Figure VI is a plan of the adjusting weight including a fragment of the pendulum as seen from the line VI—VI of Figure V.

Figure VII is an elevation of a modified form of the pendulum.

Figure VIII is a graphical representation of the relationship between the increments of load, the initial pull and the angular rotation of the improved pendulums.

These specific figures and the accompanying description are intended merely to illustrate the invention but not to impose limitations on the claims.

Load counterbalancing and load indicating mechanism constructed according to the invention is contained within a substantially watchcase-shaped housing 1 having a dial 2 on which are suitably inscribed a series of indicia 3 indicating increments of weight. An indicator 4 rotatable in response to loads being weighed sweeps over the dial 2 and cooperates with indicia 3 to indicate the magnitude of the load.

A sector guide 5, a framework consisting of four vertical members held in spaced rectangular relationship by integrally formed cross ties, is mounted in a vertical position within the housing 1. The indicator 4 is carried on a shaft that is journaled in bearings mounted in centrally located cross webs of the sector guide 5.

A pair of pendulums 6 and 7 each having fulcrum sectors 8 are suspended on the sides of the sector guide 5 by means of fulcrum ribbons 9 whose upper ends are attached to the sector guide 5 and whose lower ends are attached to the lowermost ends of the fulcrum sectors 8. The fulcrum sectors 8 correspond in function to the fulcrum pivots of an ordinary lever or fixed center pendulum, and the point of tangency, the take-off point of the fulcrum ribbons 9 from the sectors 8, forms the instantaneous center or fulcrum about which the pendulum pivots.

Forces from loads to be weighed are transmitted through a yoke 10 attached to the upper end of a steelyard rod 11 to a pair of power ribbons 12 whose upper ends overlie the peripheries of and are attached to the upper ends of power sectors 13 of the pendulums 6 and 7. The power sectors 13 are of greater radius than the fulcrum sectors 8 and extend between the sides of the sector guide 5 so that when load is added the pendulums tend to swing outwardly and to roll upwardly along the sides of the sector guide 5. The motion of the pendulum is thus a combination of rotation and translation which may be resolved into a rotation about axes passed through the centers of the fulcrum sectors 8 and an upward translation of these axes. In the counterbalancing mechanism illustrated, the translation of the pendulum is used as a measure of the load. A pair of compensating bars 14 and 15 are carried on screws 16 and 17 that are threaded through the legs of a yoke 18 and whose conical tips engage ball bearings 19 mounted in the turning centers of the pendulums 6 and 7. Midway between their ends the compensating bars 14 and 15 carry a loosely pivoted cross bar 20 from which cross bar a rack 21 is resiliently suspended. The rack 21 meshes with a pinion on the indicator shaft and serves to rotate the indicator 4 through an angle that is proportional to the upward translation of the turning centers of the pendulums 6 and 7. Because the rack is suspended from the midpoints of the compensating bars 14 and 15 its motion is the average of the upward translations of the pendulums. The pendulums rotate in opposite directions so that any sidewise tipping of the scale which causes one pendulum to increase its pull causes an equal loss of pull of the other pendulum with the result that the total pull, the position of the rack and the indication remain unchanged.

Each of the pendulums 6 and 7 is formed from a generally flat casting having a thin web 22 (Figures II and III), reinforcing ribs 23 around the periphery and a cross rib 24. The casting has laterally extending bosses 25 and 26 along its turning axis to provide support for the bearings 19 carrying the compensating bars 14 and 15. The fulcrum sectors 8 are formed as laterally extending cylindrical wall-like sections concentric with respect to the turning axis. The power sector 13 is formed by an arcuate rib at the upper end of the pendulum casting. The surfaces of the sectors over which the fulcrum and power ribbons lie are circular arcs, the fulcrum sectors being concentric with the bearings 19, while the power sectors are concentric with respect to a point 27 that is displaced from the turning center.

Each of the pendulums has a track 28 formed along one of its edges which track provides ways for mounting an adjusting weight assembly 29. The track 28 is similar to a T-slot except that the bottom of the slot is cylindrical instead of being rectangular as in the ordinary T-slot. The adjusting weight assembly 29, one for each of the pendulums 6 and 7, has a main or primary weight 30 one surface of which is machined and provided with flanges 31 forming a groove to receive the track 28. The primary weight 30, cast of lead or some heavy material, is secured in position by a pair of bolts 32 that passing through spools 33 enter the slot in the track 28 and are threaded into a cylindrical nut 34 that is slidable along the cylindrical bottom of the T-slot. The spools 33 are cast in the primary weight 30 so that the bolts 32 may be tightened without deforming the weight.

A second track is formed by an L-shaped bracket 35, one leg of which is secured under the heads of the bolts 32 while the other leg extends outwardly in the plane of the pendulum. A secondary weight comprising a subassembly 36 is mounted on the bracket 35. The secondary weight consists of a U-shaped holder 37 whose legs are notched to slide over the bracket 35. A slidable subweight 38, a spring clip 39 and a nut 40 are mounted within the U-shaped holder 37 and clamped by means of a set screw 41. This subassembly is shown in plan in Figure II and in side elevation in Figure IV. The subassembly 36 is constructed so that when the set screw 41 is loosened the parts are frictionally held by the spring clip 39 and the subweight 38 may be moved along a path that is parallel to the track 28 or the whole subassembly 36 may be moved along the secondary track formed by the bracket 35.

The solid lines of Figure III show the pendulum 7 in the position that it occupies when the indicator is at zero, i. e. with no load on the weighing scale. In this position the track 28 is vertical and the line of centers of the fulcrum and power sectors is substantially horizontal. In this position a horizontal flange 42 formed integrally with the pendulum is just clear from arresting bumpers 43 projecting from a bracket 44 mounted on the sector guide 5 and a locking horn 45 has its tip immediately below an opening 46 of a locking bar 47. The locking bar 47 is mounted for vertical movement in the sector guide 5 and is drawn downwardly when the lever mechanism of the scale is locked.

The casting for the pendulum illustrated in Figure III is made of aluminum and the weight is distributed so that the center of gravity of the pendulum casting and the adjusting weight assembly 29 lies somewhere along the track 28. The location of the track 28 is fixed according to the geometry of the sectors and the angle at which the power ribbon 12 pulls against the power sector 13 so that the linear relationship between pull in the steelyard rod 11 and angular rotation of the pendulum is maintained for any position of the weight assembly 29 along the track 28. The subweight 38 and the minor weight assembly 36 allow minor adjustments of capacity and linearity to be made after the adjusting weight assembly 29 has been clamped to the track 28.

This pendulum offers the advantages that the power or capacity of the pendulum, the difference between its pull at full capacity and at zero, may be adjusted through wide ranges by movement of the adjusting weight assembly 29 along the track 28 without changing the initial pull. This permits, for example, a hundred pound capacity scale to be changed to a two hundred pound capacity scale by merely lowering the weights along the tracks 28. The power of the pendulum can be varied over a useful range of approximately 3:1 by changing the location of the weights along the track 28.

It is not necessary that the track along which the adjusting weights are mounted shall be vertical when the indicator stands at zero. The high initial pull resulting from this vertical condition may be undesirable for some applications. The initial pull may be reduced without changing the power of the pendulum by designing the pendulum so that it may swing in toward the sector guide at low loads. A pendulum designed for lower initial pull is illustrated in Figure V. This figure corresponds to Figure III and illustrates the pendulum as it is seen from the back of the scale. In this example, a pendulum body 48, formed as a single casting, has generally cylindrical wall-like sections 49 forming fulcrum sectors, an arcuate upper rim 50 forming a power sector, laterally extending hubs 51 in which are located the centers of the fulcrum and power sectors 49 and 50, and a track 52 along which an adjusting weight assembly 53 may be positioned and secured. As in the preceding example, the pendulum is suspended from the side of a sector guide 54 by means of fulcrum ribbons 55 whose lower ends are attached to the fulcrum sectors 49. Forces from the loads to be weighed by the pendulum are transmitted through a steelyard rod 56 to a power ribbon 57 that overlies the power sector 50.

The track 52, similar to the track 28 of the preceding example, has external machined surfaces and a longitudinal slot that intersects a hole drilled parallel to the machined surfaces. The adjusting weight 53 includes a pair of major weights 58 cast of lead on the legs of a U-shaped bracket 59, the bottom of which rests against the track 52 with the weights 58 disposed on either side of the track. The bracket 59 is held in place by a pair of bolts that pass through holes in the bracket, through the slot in the track 52 and engage a cylindrical nut 60 inserted in the drilled hole. A secondary track 61 that is welded to the U-shaped bracket 59 extends in the plane of the pendulum and carries a minor adjusting weight assembly 62. The minor weight assembly comprises a U-shaped carrier 63 whole legs are notched to slide over the track 61 and that embraces between its sides a subweight 64, a spring 65 and a nut 66 that are held in clamped position by a set screw 67. This assembly is similar to the minor weight assembly 36 shown in Figures III and IV. This assembly permits the subweight 64 to be adjusted parallel to the track 52 and the minor weight assembly 62 to be adjusted along the track 61.

While a construction that includes the track along which the adjusting weights are positioned as an integral part of the pendulum provides the utmost in rigidity for a given weight of material and thus contributes to the excellence of the pendulum as a weighing element, it is not necessary that the pendulum be constructed with integral tracks. Neither is it necessary that the secondary track be mounted on the adjusting weight assembly or even be a part of that assembly. A third example of pendulum in which the adjustments are substantially independent of each other and the tracks are each attached to the sectors is illustrated in Figure VII. In this example a casting 68 having fulcrum sectors 69, a power sector 70 and laterally extending bosses 71, is provided with a downwardly extending inserted threaded stem 72 upon which a major weight 73 is adjustably secured. A secondary threaded stem 74 carrying a secondary weight 75 is provided for making half capacity adjustments in the scale. In this example the threaded stems 72 and 74 form major and secondary tracks along which the adjusting weights are positioned. This pendulum corresponds in function, adjustment power and initial pull to the pendulum illustrated in detail in Figure III.

If it is desired to reduce the initial pull of this pendulum without reducing its power it may be modified in exactly the same way that the high initial pull pendulum 7 was modified to form the low initial pull pendulum 48, i. e., by extending the fulcrum and power sectors downwardly and around toward the major weight stem 72 and allowing the pendulum to swing in toward the sector guide at light load.

In each of the pendulums illustrated a wide range of power is available by merely moving a weight along a track. In some of the examples the change in power does not affect the initial pull. In the example shown in Figure V, an increase in power is accompanied by a decrease in initial pull. In a pendulum constructed according to the design shown in Figure V the initial pull and the power may simultaneously be increased by increasing the weight of the adjusting weight assembly 53. If the weight is increased, and at the same time is moved upwardly along the track 52, the initial pull may be increased without increasing the power of the pendulum. Similarly, the weight may be decreased and moved downwardly along the track if it is desired to decrease the initial pull without changing the power of the pendulum. In like manner the power of the pendulum may be increased without changing the initial pull if the weight of the assembly is increased and it is moved downwardly along the track 52. The change in pull and power is directed proportional to the change in total mass of the pendulum if mass is added or taken away from the adjusting weight. The change in power and initial pull are also directly proportional to the distances that the weight assemblies are moved along the tracks.

Because of the transcendental nature of trigonometric functions the design of a pendulum that will rotate through equal angles for equal increments of load is not subject to an exact solution. The deviations, in a good design, are apparent only if the calculations are carried out to five or more significant figures. The restoring moment of the pendulums illustrated in the examples is proportional to the horizontal distance between a vertical plane containing the fulcrum ribbons and the center of gravity of the pendulum. When computing the location of the center of gravity, that portion of the weight of the compensating bars, yoke and rack that is carried by each pendulum is considered as being concentrated at the turning center of the pendulum, i. e. the center of curvature of the fulcrum sectors. The distance from the fulcrum plane to the center of gravity of the pendulum, as the pendulum swings through various angles, is equal to the radius of the fulcrum sectors plus the product of the distance between the turning center and the center of gravity and the sine of the angle between the vertical and the line from the turning center to the center of gravity. Thus the counterbalancing moment of the pendulum is equal to a constant plus a function of the sine of the angle. This function is not linear with respect to angle and, therefore, the effective power arm of the load must vary in such a manner that it compensates for the nonlinearity of the counterbalancing moment.

From an examination of Figure III or V it will be noticed that the power ribbons 12 or 57 are not exactly vertical, but tend to diverge from each other as they leave the yoke on the steelyard rod. The tension in each of the power ribbons, there being two in each scale assembly, is equal to half of the load applied to the yoke divided by the cosine of the angle between the power ribbon and the vertical. The moment arm at which the pull of the power ribbon is applied to the pendulum is the distance, measured perpendicular to the power ribbon, from the ribbon to the point of contact between the fulcrum sectors and the sector guide. By combining the increase in tension due to the angularity of the power ribbons with the moment arm of the ribbon, i. e. dividing the perpendicular distance from the power ribbon to the points of contact of the fulcrum sectors by the cosine of the power ribbon angle, the effective horizontal moment arm which may be called the power arm of the pendulum is obtained. By suitably selecting the distance between the centers of the fulcrum and the power sectors as well as the difference in radii of the sectors it is possible to match the power arm of the pendulum against the counterbalancing moment arm to obtain substantially equal increments of angle for equal increments of load. This relationship holds when the distance between the centers of curvature of the sectors is slightly less than one-third of the distance between the peripheries of the sectors measured along a line passing through the centers of the sectors.

It has further been found that the tracks 28, 52 or 72 should be vertical or substantially so when the power arm of the pendulum is a maximum. This relationship is not exact because the angle between the power ribbons and the vertical changes with load and the angularity of the power ribbon is increasingly more effective in affecting the pendulum as the line of centers of the sectors departs from the horizontal. These considerations fix the direction of the tracks but do not determine their location with respect to the sectors. Calculations confirmed by experiment indicate that the locus of the centers of gravity of the pendulum to which locus the tracks 28, 52 or 72 are parallel, intersects the line of centers of the sectors on the side opposite the power sector at a distance beyond the centers which is a function of the radii of the sectors and the eccentricity of the power sectors with respect to the fulcrum sectors. The position of this locus was determined experimentally by adjusting the pendulum for correct operation with the weight near the bottom of the track, locating the center of gravity, then moving the weight to the top of the track and again adjusting it for linear operation. The two locations of the center of gravity thus determined fixes the locus for the tracks. In the example shown in Figure III the track is made to coincide with the locus and the major adjusting weight assembly is made of such mass and shape that the resultant center of gravity lies on the track 28. In the example shown in Figure V the track 52 is parallel to the locus but not coincident therewith and the shape of the adjusting weights is altered so as to bring the resultant center of gravity onto the required locus.

Effect of adjustments

The effect of making various adjustments on the pendulum is illustrated in Figure VIII. This figure shows a graph of the pull on the steelyard rod plotted as ordinates against the corresponding angular rotation of the pendulum as abscissa. The operating range for the pendulum shown in Figure III, when in correct adjustment, is represented by that portion of the line 76—77 located between the lines denominated zero degrees and sixty degrees. The angles are measured counterclockwise from that angle at which the primary adjusting track is vertical. The operating range of the pendulum shown in Figure V is that portion of the line 76—77 lying between minus twenty degrees and plus forty degrees. Considering the pendulum of Figure III, if the weight assembly 29 is lowered along the track 28 or if the subweight 38 is moved downwardly through the U-shaped holder 37, the power of the pendulum is increased so that it operates along a line 78—79 that intersects the original line 76—77 at zero degrees. Likewise if either of the weights are raised the operation is then along the line 78—80. The effect of moving the weight parallel to the track is merely to change the slope of the line without introducing any curvature into it. This means that if the scale is assembled and balanced with the indicator at zero and the track vertical that a full load may be applied and the scale corrected at full capacity by merely moving the weight along the line parallel to the track until the full scale reading is correct, and that such adjustment will not aggravate the error at half capacity, nor will it change the condition of balance of the scale at zero.

If the minor weight assembly 36 is moved along the secondary track 35 it produces several effects. The first of these effects, observed at zero, is a change in initial pull. If the weight is moved outwardly along the track 35, the initial pull is increased so that after the change it is represented by the point 81 in Figure VIII. Suppose, for the moment, that the track 35 extends perpendicular to the track 28 so that the vertical position of the center of gravity remains unchanged. Then as the pendulum swings upwardly so that the track tends to point in an upward direction, the effectiveness of the change continuously decreases with increase in angle so that the scale instead of operating along a straight line such as the line 78—77 operates along a curve 81—82—83. However, for convenience in adjusting the scale, since this curvature is used to secure correct half capacity readings, it is desirable that the line 81—83, the chord of the curve 81—82—83, remains parallel to the line 78—77 because the line may be shifted vertically without changing slope or curvature by changing the initial pull. The line 81—83 can be pivoted about the point 81 by moving either the whole adjustable weight assembly 29 or the subweight 38 downwardly which has the effect of increasing the capacity at full scale so that the line 81—83 is brought up to the position 81—84. To avoid making two adjustments in order to introduce curvature into the line and yet maintain the same slope of the line between the end points the track 35 is given a downward slope when the pendulum is at zero so that the two adjustments are made simultaneously when the weight is moved along the track. Thus, in the example shown in Figure III the change in pull produced by sliding the minor weight assembly along the track 35 is the same whether the pendulum is at zero (shown in solid lines) or whether the pendulum is at full scale position shown in broken lines. The angle of the track 35 as measured from a horizontal line at each of these two pendulum positions is not the same because the power horizontal projection of the track 35 at these positions must be proportional to the arms at which the ribbon 12 acts rather than being equal. If the adjusting weight is moved inwardly toward the larger weight the initial pull is decreased and the curve bows downwardly.

The rise in the curve 81—82—83 over its chord 81—83 is approximately one-tenth of the change in initial pull represented by the distance 78—81. This relationship is used in adjusting the pendulum to remove an error at half capacity by shifting the secondary weight assemblies 36 along the tracks 35 until the change in scale indication is approximately ten times as great and in the opposite direction as the observed error at half load. When the load is taken off the scale and it is rebalanced at zero by a change in the initial pull—addition or removal of weight from a loading box—the scale will be found to be in reasonably good adjustment. A repetition of the adjusting process, i. e. applying a full capacity load and adjusting the subweight 38 to bring the indicator into correct registry, then reducing the load to half and adjusting the minor weight assembly along the track 35 according to the ten to one relation and finally rebalancing at zero will, in most instances, bring the scale into as close an adjustment as may be made.

The pendulum shown in Figure V whose operating range is from minus twenty degrees to plus forty degrees is adjusted by a similar procedure. However, because the track 52 is not vertical when the indicator is at zero, the initial pull is changed when any change in power is made. Therefore, if a scale embodying the pendulum of Figure V is balanced at zero and found to be in error with a full capacity load, the error at full capacity must be removed by shifting the subweight 64 to eliminate two-thirds of the error and changing the initial pull to correct the remaining one-third. Then the scale is loaded to half capacity and the error in indication noted. The minor weight assembly 62 is moved along the track 61 until the error in indication at half capacity is reversed in sign and increased to about ten times its original amount. The scale is then brought to zero and rebalanced. This sequence of steps removes most of the error and one or two repetitions of the sequence will serve to remove the residual error.

The adjustments for either pendulum are easy to make and are not particularly critical because in each instance a comparatively small mass is moved a large distance to effect a small change in position of the center of gravity of the pendulum assembly. The locus of movement of the adjusting weights is such that movement of one weight changes the capacity or power of the pendulum without affecting its linearity, while movement of the other weight changes the linearity without changing the power or capacity of the pendulum.

The one piece construction provides exceptional strength and rigidity as well as uniform temperature characteristics so that change errors are reduced to a minimum. The increased rigidity of the improved pendulum permits a much better distribution of its weight so that most of the weight is effective in providing either initial pull or power and very little of it is located in the upper part of the pendulum—the sectors—where it contributes to the inertia of the pendulum but not to its counterbalancing capacity.

If for any reason it is desired to change the capacity or power of the pendulum by the addition of weight without affecting either the initial pull or the linearity of the pendulum, the pendulum may be designed so that when the indicator is at zero the locus of the centers of gravity, the line parallel to the track 52 for example, intersects the vertical plane of the fulcrum ribbons. Weight added to the pendulum at this intersection will not change the initial pull because it is added at a point immediately below the point of support of the pendulum nor will it change the linearity of the pendulum because the addition of weight at the intersection of the line and the plane is merely equivalent to moving the adjusting weights downwardly along the track at the same time that their magnitude is increased.

Various modifications of the improved pendulum may be made to meet the various requirements of initial pull and power, and still maintain the advantage of independence of adjustments.

Having described the invention, I claim:

1. A pendulum for a weighing scale, the pendulum comprising a fulcrum sector having a center, a power sector having a center that is displaced from the center of the fulcrum sector, a rectilinear track that is generally perpendicular to the line connecting the centers of the fulcrum and power sectors, a weight movable along the track, a second rectilinear track having a fixed acute angular relation to the first rectilinear track, and a second weight movable along the second track.

2. A pendulum for a weighing scale, the pendulum comprising a member in which is formed a fulcrum sector, an eccentric power sector and a rectilinear track that is generally perpendicular to the line of centers of the power and fulcrum sectors; a weight movable along the track, a second track positioned at an acute angle with respect to the first track, and a weight movable along the second track.

3. In a pendulum for a weighing scale, a pendulum body having an axis of rotation, a power sector to which load forces may be tangentially applied and which is eccentric to the turning axis to vary the effective moment arm of the load force as the pendulum turns on its axis, a second sector to which force may be tangentially applied and which is substantially concentric with the turning axis, a rectilinear track that stands vertical when the line of action of the load force is generally perpendicular to the line of centers of the sectors, and a second track arranged at an angle to the first track such that at each end of the pendulum travel the horizontal projection of the second track is substantially proportional to the effective moment arm of the load force.

4. A pendulum body according to claim 3 having a weight mounted on the rectilinear track and having said second track formed on said weight.

5. In an automatic weighing scale, in combination, a pendulum having a sector to which load forces are tangentially applied, said sector being arranged eccentric to the turning axis of the pendulum so that the moment arm of the load force varies with the position of the pendulum, an adjusting weight, and a track on the pendulum to support the weight, the track being arranged with respect to the sector so that at two preselected and spaced apart positions in the range of travel of the pendulum the horizontal projections of the track are proportional to the corresponding moment arms of the load forces 6. In an automatic weighing scale, in combination, a pendulum having a sector to which load forces are tangentially applied, said sector being arranged eccentric to the turning axis of the pendulum so that the moment arm of the load force varies with the position of the pendulum, an adjusting weight, a track on the pendulum to support the weight, the track being arranged with respect to the sector so that at the ends of the pendulum travel the horizontal projections of the track are proportional to the corresponding moment arms of the load forces.

LAWRENCE S. WILLIAMS.

REFERENCES CITED

The following references are of record in the file of this patent:

UNITED STATES PATENTS

| Number | Name | Date |
|---|---|---|
| 146,944 | Parr | Jan. 27, 1874 |
| 655,147 | De Vilbiss | July 31, 1900 |
| 1,088,321 | Charet | Feb. 24, 1914 |
| 1,454,047 | Emery | May 8, 1923 |
| 1,515,034 | Griswold | Nov. 11, 1924 |
| 1,890,977 | Kelly | Dec. 13, 1932 |
| 2,217,244 | Williams | Oct. 8, 1940 |
| 2,294,819 | Williams | Sept. 1, 1942 |